Aug. 19, 1924.
O. F. WALKER
1,505,450
APPARATUS FOR CONTROLLING THE FLOW OR PRESSURE OF FLUIDS
Filed Nov. 8, 1923     2 Sheets-Sheet 1
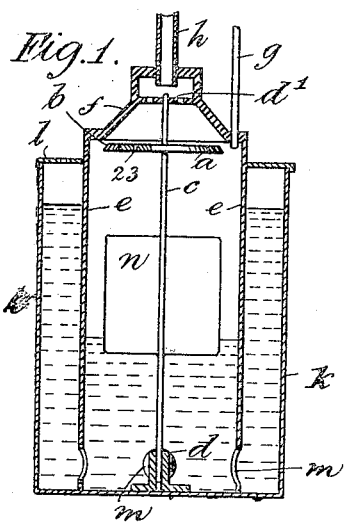
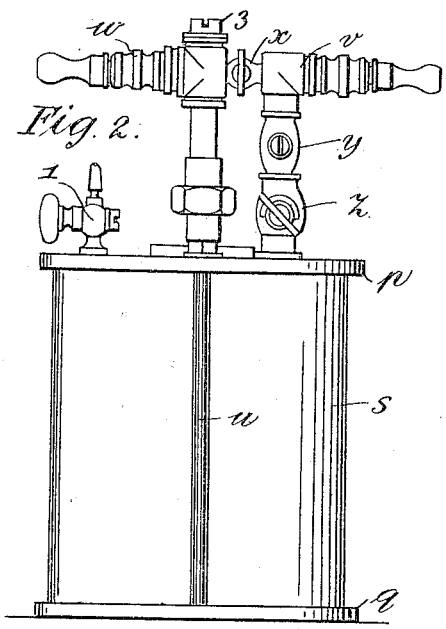
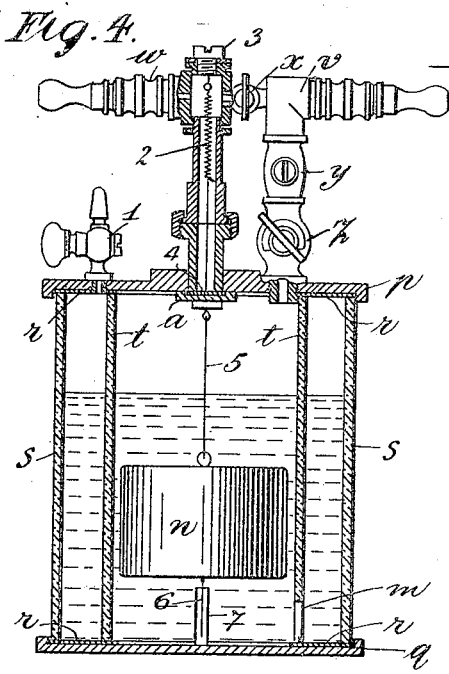
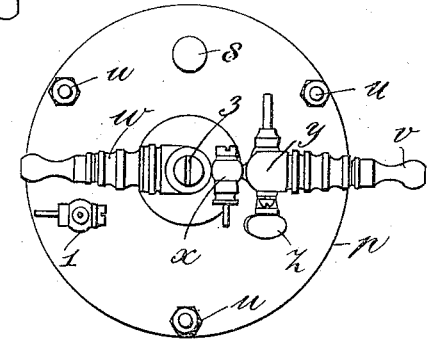
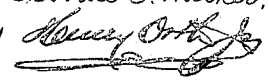

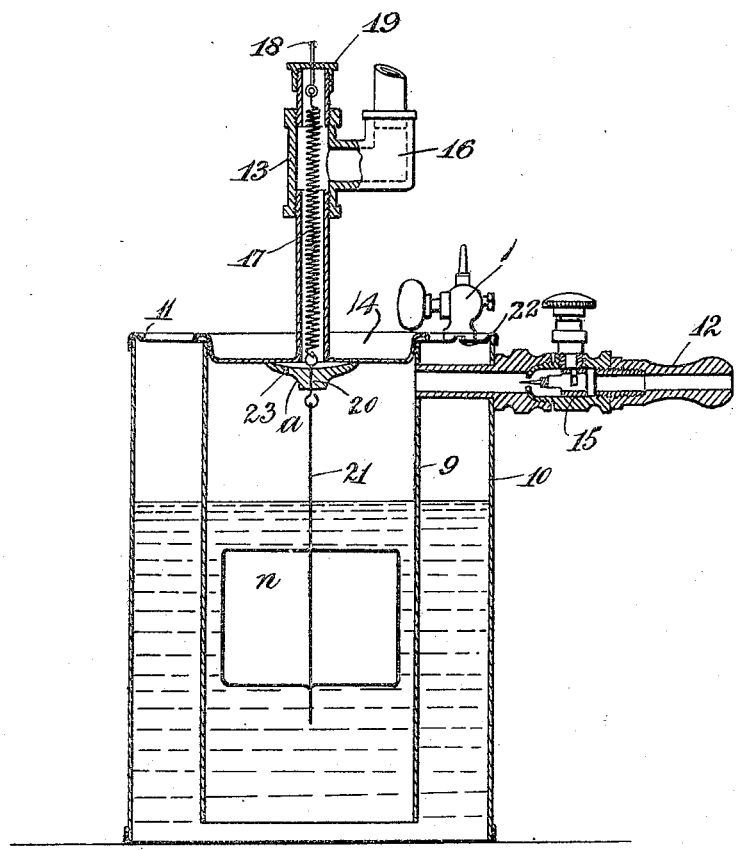

Patented Aug. 19, 1924.

1,505,450

UNITED STATES PATENT OFFICE.

OSBORNE FREDERICK WALKER, OF LONDON, ENGLAND.

APPARATUS FOR CONTROLLING THE FLOW OR PRESSURE OF FLUIDS.

Application filed November 8, 1923. Serial No. 673,548.

*To all whom it may concern:*

Be it known that I, OSBORNE FREDERICK WALKER, a subject of the King of Great Britain, and resident of London, England, have invented certain new and useful Improvements in or Relating to Apparatus for Controlling the Flow or Pressure of Fluids, of which the following is a specification.

This invention comprises improvements in or relating to apparatus for controlling the flow or pressure of fluids, and particularly for controlling or regulating the flow or pressure of illuminating gas so that a constant supply may be automatically transformed into an intermittent supply and whereby the apparatus may be suitable for use with intermittently illuminated gas signs.

The invention relates to control apparatus of that kind in which a control valve is actuated by a float according to the rise and fall of liquid in a float chamber in the fluid supply circuit of a consuming device, the said chamber having its outlet to the consuming device controlled by the valve and the latter opening upon the fall of the liquid due to the pressure of the fluid supply and closing when the liquid level rises again after release of gas through the open valve. Heretofore the closing of the valve has been dependent on the equalization of pressure in the float chamber and another chamber into which the liquid was expelled on the descent of the float or on the head of liquid created in such other chamber.

The particular object of the present invention is to simplify the construction of the kind of apparatus referred to and to render same less costly to produce, while increasing the efficiency.

According to this invention, the inlet for gas or fluid to the float chamber in an apparatus of the kind referred to is adapted to supply less gas or fluid to the chamber than the outlet is capable of passing. With this arrangement, the float chamber may be arranged in an outer vessel or container which is open or ported to the atmosphere so that the pressure of the atmosphere may be depended upon for closing the valve. The gas inlet pipe to the float chamber may be made of smaller cross-sectional area than the outlet pipe, but as an alternative the area of the inlet may be adapted to be constricted by means of a valve, adjustable as to the extent of opening. The control valve for the fluid or gas outlet aforesaid is preferably arranged coaxially of the float so as to be directly lifted thereby to close it, and it may be loaded by a spring adjustable as to tension.

In order to enable the invention to be readily understood, reference is directed to the accompanying drawings, in which:—

Figure 1 is a central vertical section of one form of apparatus constructed according to these improvements.

Figure 2 is an elevation of a modification,

Figure 3 is a plan of Figure 2, and

Figure 4 is a sectional elevation of Figure 2, while

Figure 5 is a sectional elevation of another form of apparatus.

According to the construction shown in Figure 1, the valve $a$ is of the disc type, preferably with a tapering valve face $b$ of annular form, and it is mounted upon a vertically movable rod or stem $c$ arranged in guides $d$ $d'$ within a chamber $e$. The valve $a$ co-operates with a seat in the upper end of the chamber $e$, which is closed by a cover $f$ but has connections, one above and one below the valve seat, with a gas inlet $g$ and a gas outlet $h$, which may be constituted by pipes or the like. The chamber $e$ is suitably of cylindrical form, of metal, and mounted concentrically within an outer metal vessel or container $k$, open at its upper end, or ported or perforated as at $l$, so that liquid therein is subject to atmospheric pressure. Liquid is free to pass from the cylindrical chamber $e$ into the vessel $k$ and vice versa through perforations or openings $m$ at the lower end of such chamber. The valve stem $c$ may extend from the top to the bottom of the chamber $e$, there being a guide $d$ for it at the bottom of the chamber and another $d'$ at the top. The upper guide $d'$, conveniently, takes the form of a perforated plate or spider, extending across a restricted part of the cover $f$ of the chamber $e$. This cover is somewhat of an inverted funnel shape and the said upper guide is situated at the junction of the tapering and upright walls of the funnel-like part as shown. The tapering wall is, suitably, of the same conicity as the tapering face $b$ of the valve $a$ so as to form the valve seat aforesaid and the gas outlet $h$ is led from the upper end of the upright part of the funnel-shaped cover $f$. Upon the valve stem $c$ and at a suitable level, a hollow float $n$ is secured and the position of the float, as determined by the level of the liquid in the chamber $e$, determines the position of the valve $a$.

The action of the apparatus is as follows:

Liquid, such as water, glycerine or mineral oil, is first supplied to the outer vessel $k$, passing thence to the inner chamber $e$ through the perforations or openings $m$ aforesaid. Sufficient liquid is supplied to cause the float $m$ to rise and close the valve $a$ on to its seat, and also, if desired, to provide a suitable head of liquid in the vessel $k$ in equilibrium with the pressure of the air or gas imprisoned in the chamber $e$ above the liquid therein. This head of liquid may vary according to requirements. Gas, above atmospheric pressure, is now admitted to the inner chamber $e$ through the pipe $g$ and the pressure causes the liquid level to fall therein. This takes place until a level (as shown for example) is reached at which the buoyancy of the float $n$ no longer serves to keep the valve $a$ closed, so that the valve opens. This opening of the valve $a$ permits gas to pass to the outlet $h$ past the valve, and since the inlet $g$ for gas to the chamber is constructed to pass a smaller amount of gas than the outlet $h$, the latter, preferably, having a larger cross sectional area than the former, the pressure of gas in the chamber $e$ will fall and will continue to do so, so long as the valve is open. This fall of pressure brings about a rise of the liquid in the chamber $e$, owing to the head of liquid in the outer vessel $k$, and eventually the valve $a$ closes again. Thereupon, when sufficient pressure again accumulates in the chamber $e$, the valve $a$ opens again and so on. Thus, by alternate opening and closing of the valve $a$, an intermittent supply of gas is obtained although the supply of gas by the inlet $g$ is practically continuous. Therefore, supposing the pipe $h$ to be the supply pipe for the gas jets or lamps of an illuminated sign, it will be seen that the sign will emit a continuous series of flashes.

According to the modification illustrated in Figures 2 to 4, the apparatus comprises upper and lower metal discs $p$, $q$ recessed to receive packing rings $r$ as shown in Figure 4, and between these discs, two thick glass cylinders $s$, $t$ are clamped by means of the bolts $u$ so as to form inner and outer chambers concentric with each other. The packing rings $r$ may be of cork or other suitable material to prevent escape of liquid at the ends of the glass cylinders $s$, $t$. The liquid used may be relatively heavy mineral oil or other suitable liquid. The cover disc $p$ is fitted with inlet and outlet connections $v$, $w$, respectively, for gas and these connections are bridged at the upper end by a by-pass connection fitted with a pilot valve $x$. The inlet connection $v$ comprises two valves $y$, $z$ for use as hereinafter described. The cover disc $p$ is also fitted with a valve fitting 1 adapted for placing the outer chamber of the apparatus in connection with atmosphere. The outlet connection $w$ is shown partly in section in Figure 4 in order that it may be seen that the valve $a$ is suspended from a spring 2 depending from a screw-in plug 3. Adjustment of this plug alters the tension of the spring and the employment of the spring avoids having to use precise guiding devices for the float $n$. The valve, as shown, is of disc form adapted to seat around the entrance to the outlet connection $w$ and it is recessed for the reception of a packing disc 4. From the valve $a$ the float $n$ is suspended by a link 5 and the float is provided below with a guide stem 6, engageable with the guide 7 fitted on the bottom disc $q$. As in the previous case, the inlet $v$ communicates freely with the inner chamber of the apparatus, while communication between such chamber and the outlet connection $w$ is controlled by the valve $a$. Also an opening or openings $m$ is provided in the lower part of the inner cylinder $t$ to allow flow of oil or other liquid between the inner and outer chambers. The cover $p$ has a filling opening closed by a plug 8 (Figure 3). Assuming, now, that the apparatus has been placed in circuit with the gas supply and consuming device, the operation is as follows: First close both valves $y$ $z$ and open the pilot valve $x$ to the full extent and light up the consuming device. Then gradually close the pilot valve until only sufficient gas passes to keep up a pilot supply. Also see that valve 1 is open. Next, open both valves $y$, $z$ fully so that gas enters the inner chamber $t$ of the apparatus. This causes the liquid to fall in the said chamber and to rise in the outer cylinder $s$ and eventually the float $n$ will drop and open valve $a$. A full supply of gas will then pass to the consuming device through the outlet connection $w$. The apparatus works properly when less gas is admitted than the consuming device is capable of passing. Therefore the valve $z$ is now gradually closed until the float $n$ rises, and causes the valve $a$ to close. Pressure will thus increase in the inner chamber of the apparatus and soon the liquid, in falling, will cause the valve $a$ to open, and so on, the valve $a$ opening and closing at regular intervals. The proper setting of the valve $z$ is readily effected to give the required result and, if desired, the valve may be an ordinary needle valve, such as is used on gas burners, to allow of fine adjustments. A few trials will soon determine the best adjustment of the valve and henceforth it should not need further adjustment. Once the apparatus is thus set it is only necessary to close or open the valve $y$ to respectively put the consuming device out of or into operation. The length of the periods of opening of the valve $a$ may be varied by adjusting the amount of opening of the valve 1.

It will be observed that the apparatus can be readily fitted to any existing illuminated sign for the intermittent flashing thereof, and it is entirely automatic in action. The use of inner and outer glass cylinders as described also enables the operation of the device to be seen, a feature which is not only of importance from the practical point of view, but also is an attraction to the eye and therefore valuable as an advertising medium.

The apparatus shown in Figure 5 is intended to supply the needs of those requiring a cheaper form of apparatus than that shown in Figures 2 to 4. It consists of inner and outer cylindrical vessels 9, 10 of sheet metal, joined at the top by an annulus 11, the inner cylinder being slightly shorter than the outer one so as to leave space at the bottom for the flow of liquid between the two cylinders. The liquid used may be water. The gas inlet 12 connects with the inner chamber as shown, being soldered in position, while the outlet 13 is secured to the lid 14 which serves to close the upper end of the inner cylinder 9 and may be packed to prevent leakage. The inlet connection 12 is fitted with a regulatable needle valve 15, of the type used in gas burners, but, obviously, a screw-down valve or a plug valve may be used, and the outlet connection 13 is branched at 16 to the consuming device, not shown. The valve $a$ is suitably made of rubber and suspended by a spring 17 from a hook 18 soldered into the screw-on cap 19 of the connection 13. The screw-on cap 19 allows of adjustment of the tension of the spring. The latter at its lower end is attached to a link 20 embedded in the body of the valve $a$ and the float $n$ is attached by a rod 21 to the lower end of the link 20. The annulus 11 is ported or perforated at one or more places, as at 22, to allow the passage of air in the operation of the apparatus, which will be understood from what has already been said in connection with the construction shown in Figures 1 to 4. Obviously, the opening 22 may also be furnished with a valve fitting 1, as illustrated.

As an alternative, to the use of a by-pass between the inlet and outlet connections, as described with reference to Figures 2 to 4 for example, it will be understood that the valve $a$ may have a small opening or openings 23 therein, as shown in Figures 1 and 5, or there may be a notch or notches in the periphery of the valve, so that gas is not entirely cut off upon the closing of the valve.

The period of opening of the valve $a$ can be varied by regulating the speed of flow of the liquid between the inner and outer chambers for example, by regulating the area of the openings $m$ aforesaid (Figures 1 and 4), but the length of the period of opening of the valve may be controlled by variation of the size of the air port of the outer chamber, by means of the valve 1, Figures 2 to 4 for example, as hereinbefore described.

The invention further contemplates the employment, if desired, of magnetic force acting between the valve $a$ and its seat, the valve or the seat being permanently magnetized for this purpose. In this way the opening of the valve is delayed just slightly beyond the time which would be determined by the fall of the float $n$, owing to the magnetic attraction between the valve and its seat, but when the liquid in the inner chamber has fallen a little further, the weight of the float comes into play to open the valve quickly, the weight being sufficient to overcome the magnetic force. If desired, the float may be weighted with liquid or otherwise to enhance this effect. On the rising of the float to close the valve, the magnetic attraction will have the reverse effect, as will be readily understood, although possibly, not to the same degree. This will not matter so much, however, because the important thing is to obtain rapid opening of the valve and thus, rapid flashing up of the sign or other device.

It is to be noticed that with the present apparatus, the opening of the valve can be brought about by the pressure under which the gas is usually supplied from mains, and that it is not necessary to cause variations of pressure in the mains so as to bring about the desired regulating or controlling effect.

I claim:—

1. In an apparatus of the character described, a chamber having a gas inlet and a gas outlet, a second chamber communicating at its bottom with the first chamber, a liquid partially filling the chambers, regulable air vent means for said second chamber to control the rate of change of level in the chambers and a float-controlled valve controlling said gas outlet.

2. In an apparatus of the character described the combination with an inner chamber having a gas inlet and a gas outlet, an outer chamber communicating at its bottom with said inner chamber, a liquid partially filling the chambers and a float in said inner chamber; of a valve operated by said float and controlling said gas outlet having a permanently open vent connecting the inner chamber and gas outlet, and a valve-controlled air vent for the outer chamber.

3. An apparatus of the character described comprising a fluid container communicating with the atmosphere, a chamber mounted in and communicating with the container near the bottom of the latter and having a fluid outlet in the top, a float in the chamber, a spring-loaded valve controlling the outlet and operated by the downward movement of the float to open the outlet, said chamber having a fluid inlet in its top of less capacity than the outlet, and means to control the pressure in the container.

4. In an apparatus of the character described, an outer container vented to the atmosphere and an inner container, a liquid partially filling the containers, said containers communicating with one another at liquid spaces therein, means to control the vent in the outer container, a float in the inner container, means to admit illuminating gas to the inner container, means to discharge gas from the inner container of greater capacity than said inlet means, a valve controlling said discharge means and connected to said float, said valve having a small gas passage therethrough, and an adjustable spring in the discharge means urging said valve to closed position against the opening action of the float.

OSBORNE FREDERICK WALKER.